United States Patent [19]

Akashi et al.

[11] Patent Number: 5,558,813

[45] Date of Patent: *Sep. 24, 1996

[54] LIQUID CRYSTAL-POLYMER COMPOSITE FILM

[75] Inventors: Ryojiro Akashi; Toru Ishii; Tomozumi Uesaka, all of Kanagawa, Japan

[73] Assignee: Fuji Xerox Co., Ltd., Tokyo, Japan

[*] Notice: The term of this patent shall not extend beyond the expiration date of Pat. No. 5,354,498.

[21] Appl. No.: 347,161

[22] Filed: Nov. 23, 1994

Related U.S. Application Data

[63] Continuation of Ser. No. 856,699, Mar. 24, 1992, abandoned.

[30] Foreign Application Priority Data

Mar. 25, 1991 [JP] Japan .................................. 3-083030

[51] Int. Cl.$^6$ ........................... C09K 19/52; C09K 19/54
[52] U.S. Cl. ................... 252/299.01; 252/299.5
[58] Field of Search ........................... 252/299.01, 299.5

[56] References Cited

U.S. PATENT DOCUMENTS

| | | | |
|---|---|---|---|
| 4,994,204 | 2/1991 | Doane et al. | 252/299.01 |
| 5,015,057 | 5/1991 | Rumbaugh et al. | 359/53 X |
| 5,087,387 | 2/1992 | Mullen et al. | 252/299.5 |
| 5,188,760 | 2/1993 | Hikmet et al. | 252/299.01 |
| 5,210,630 | 5/1993 | Heynderickx et al. | 359/106 |
| 5,354,498 | 10/1994 | Akashi et al. | 252/299.01 |
| 5,372,745 | 12/1994 | Yoshinaga et al. | 252/299.01 |

FOREIGN PATENT DOCUMENTS

| | | |
|---|---|---|
| 1312527 | 12/1989 | Japan . |
| 2086692 | 3/1990 | Japan . |
| 2171720 | 7/1990 | Japan . |

OTHER PUBLICATIONS

Aggregation States and Bistable Light Switching of (Liquid Crystalline Polymer)/(Low Molecular Weight Liquid Crystal) Mixture Systems, Tisato Kajiyama et al. Chemistry Letters pp. 817–820, 1989.

Polymer Preprints, Japan vol. 40, No. 3, p. 1024, 1991.

*Primary Examiner*—C. H. Kelly
*Attorney, Agent, or Firm*—Finnegan, Henderson, Farabow, Garrett & Dunner, L.L.P.

[57] ABSTRACT

A liquid crystal-polymer composite film comprising a polymeric substance carrying a liquid crystal component and a non-liquid crystal component in the side chain thereof and having dispersed therein a low-molecular weight liquid crystal compound and an optical modulation element using the composite film are disclosed. The composite film can be driven at a low voltage and exhibits hysteresis.

10 Claims, 4 Drawing Sheets

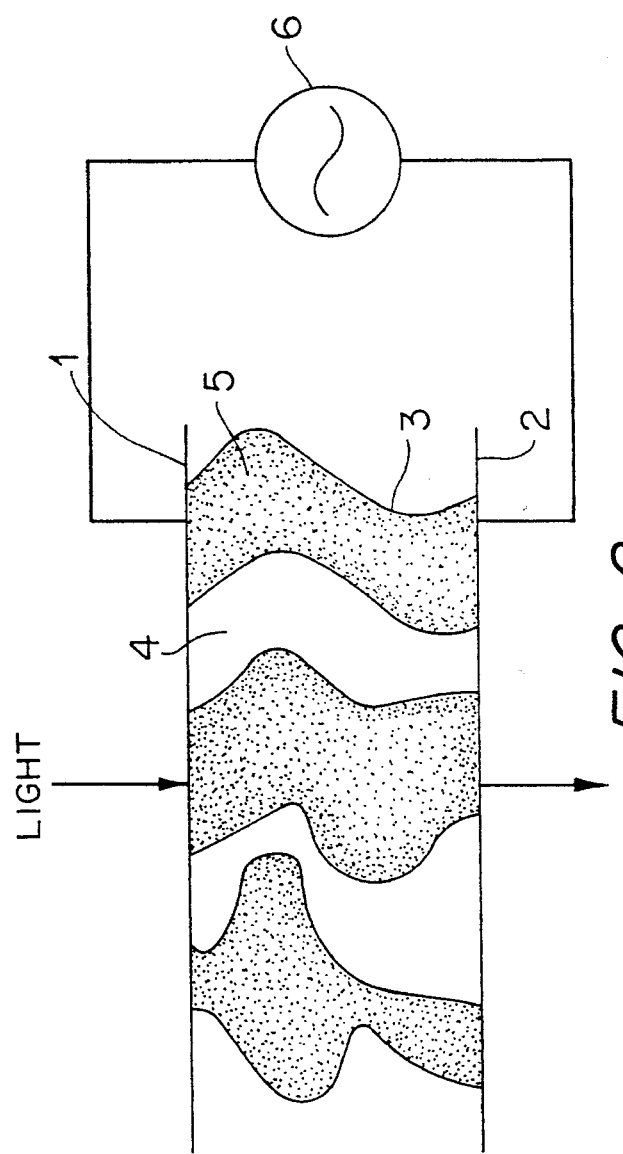
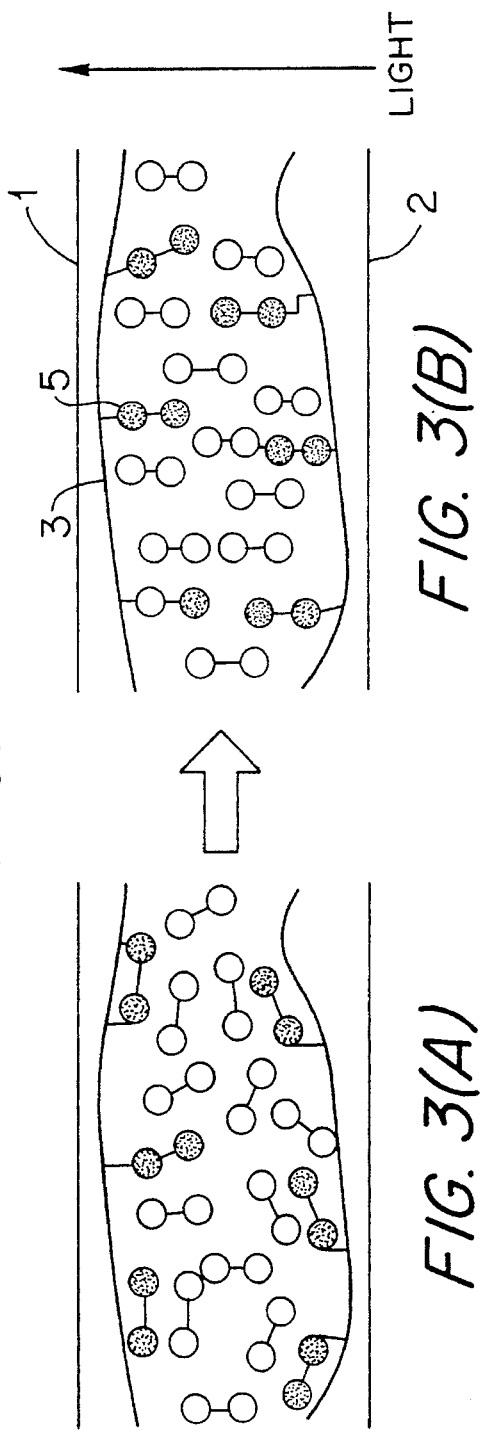

LIQUID CRYSTAL-POLYMER COMPOSITE FILM

This application is a continuation of application Ser. No. 07/856,699, filed Mar. 24, 1992, now abandoned.

FIELD OF THE INVENTION

The present invention relates to a novel liquid crystal-polymer composite film which is widely useful in display elements, light controlling elements, optical modulation elements, optical shutters, memory elements, etc.

BACKGROUND OF THE INVENTION

Low-molecular weight liquid crystal compounds are the most representative display materials for flat panel displays and have been widely used in TN mode liquid crystal displays, e.g., for digital watches, and STN mode liquid crystal displays, e.g., for lap-top computers and lap-top word processors. In these displays, "on" (transparent) and "off" (non-transparent) states are controlled by utilizing the phenomenon that the light transmitted through the liquid crystal layer changes its plane of polarization with a voltage applied. Therefore, the devices must have a pair of polarizing sheets to sandwich the liquid crystal layer. Further, an orientation treatment is essentially needed for the liquid crystal layer to have specific orientations.

In recent years, hybrid type liquid crystal display elements have been proposed, in which the low-molecular weight liquid crystal compound is supported in a polymeric binder by dispersion or encapsulation as disclosed, e.g., in U.S. Pat. No. 4,435,047, laid-open International application Sho-58-501631 and JP-A-1-312527 (the term "JP-A" as used herein means an "unexamined published Japanese patent application"). In this type of displays, switching between "on" and "off" states, i.e., "transparent" and "scattering" states, is controlled by utilizing the phenomenon that the light transmitted changes its scattering state with a voltage applied. Therefore, the necessity of polarizing sheets as having been used in conventional TN and STN mode liquid crystal display elements can be eliminated, and it is expected to realize brighter display elements. Further, any alignment film is not needed, thus removing the steps involved therefor, such as printing, baking and rubbing of an orientation film, which is expected to bring about great reduction of production cost.

However, because the conventional hybrid type display elements composed of a polymeric binder having maintained therein a low-molecular weight liquid crystal compound need a high driving voltage of from 60 to 100 Vrms, they have a narrow range of application and have found use only as simple light controlling elements (such as light controlling glass). Moreover, they lack in steepness in the voltage v. transmission curve and have no hysteresis characteristics, which disadvantages have made it practically difficult to apply them to wide-area display elements.

SUMMARY OF THE INVENTION

An object of the present invention is to provide a liquid crystal-polymer composite film which can be used not only for a light controlling element but also for a display element, an optical modulation element, an optical shutter, and a memory element that can be driven at a low voltage.

Another object of the present invention is to provide a liquid crystal-polymer composite film which exhibits hysteresis characteristics and is therefore applicable to display elements of wider area.

Further object of the present invention is to provide a device, such as an optical modulation element, using the liquid crystal-polymer composite film.

Other objects and effects of the present invention will be apparent from the following description.

The present invention provides a liquid crystal-polymer composite film comprising a polymeric substance carrying a liquid crystal component and a non-liquid crystal component in the side chain thereof and having dispersed therein a low-molecular weight liquid crystal compound.

The present invention also provides an optical modulation element comprising the above liquid crystal-polymer composite film and a means for voltage application provided close to the liquid crystal-polymer composite film.

Preferred embodiments of the liquid crystal-polymer composite film according to the present invention include:

(a) the above liquid crystal-polymer composite film in which the molar ratio of the liquid crystal component to the non-liquid crystal component (liquid crystal component)/-(non-liquid crystal component) is in the range of from $0.1/100$ to $100/1$;

(b) the above liquid crystal-polymer composite film in which the weight ratio of the low-molecular weight liquid crystal compound to the polymeric substance (low-molecular weight liquid crystal compound)/(polymeric substance) is in the range of from $50/1$ to $1/10$;

(c) the above liquid crystal-polymer composite film in which the polymeric substance and the low-molecular weight liquid crystal compound are in separate phases; and (d) the above liquid crystal-polymer composite film in which the polymeric substance is a copolymer of a liquid crystal vinyl monomer and a non-liquid crystal vinyl monomer.

BRIEF DESCRIPTION OF THE DRAWING

FIG. 2 is a schematic block diagram of the device using the composite film according to the present invention.

FIG. 3(A) and (B) illustrate the working mechanism of the composite film according to the present invention.

DETAILED DESCRIPTION OF THE INVENTION

Figure 1A:
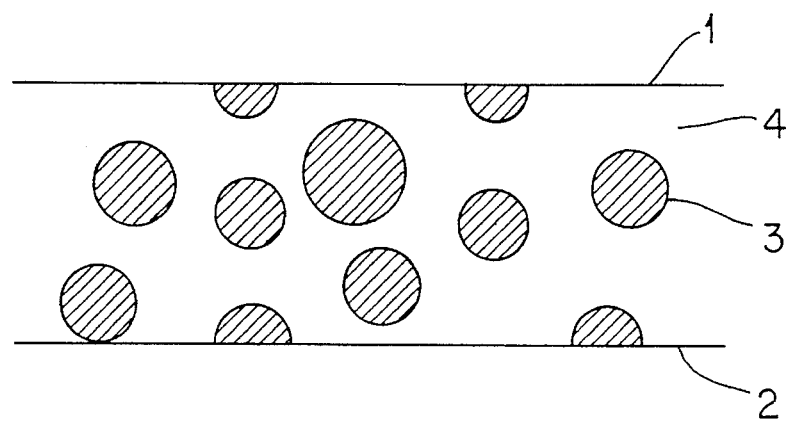
FIG. 1(A) (B) and (C) schematically illustrate the composite film according to the present invention.

The polymeric substance which can be used in the liquid crystal-polymer composite film of the present invention is a polymer having at least a liquid crystal component and a non-liquid crystal component in the side chain thereof. Homopolymers having a liquid crystal component in the side chain thereof called "side chain type liquid crystal polymers" have been known as electro-optical materials. The polymeric substance used in the present invention is obtained by copolymerizing or addition-reacting a polymerizable or addition-reactive liquid crystal monomer used in such side chain type liquid crystal polymers with a non-liquid crystal monomer at a prescribed ratio.

Polymerizable liquid crystal monomers which can be used in the present invention are described, e.g., in *Makromol. Chem.*, p. 179 and P. 273 (1978) and *Eur. Polym. J.*, Vol. 18, p. 651 (1982). Specific examples thereof include various known liquid crystal compounds having a vinyl group or a (meth)acrylic group as a polymerizable functional group via an appropriate alkyl spacer, such as biphenyl compounds, phenyl benzoate compounds, cyclohexylbenzene compounds, azoxybenzene compounds, azobenzene compounds, azomethine compounds, terphenyl compounds, biphenyl benzoate compounds, cyclohexylbiphenyl compounds, phenylpyrimidine compounds, cyclohexylpyrimidine compounds, and cholesterol compounds. The term "(meth)acrylic" and the like used herein mean "acrylic or methacrylic" and the like.

In cases where a liquid crystal side chain and a non-liquid crystal side chain are introduced into a polymer by addition reaction, the above-mentioned compounds with the vinyl group or (meth)acrylic group thereof being substituted with an addition-reactive group, e.g., an acrylic group can be used. Such compounds are described, e.g., in *Makromol. Chem., Rapid Commun.*, Vol. 3, P. 557 (1982).

Typical examples of the above-mentioned polymerizable liquid crystal monomers are shown below.

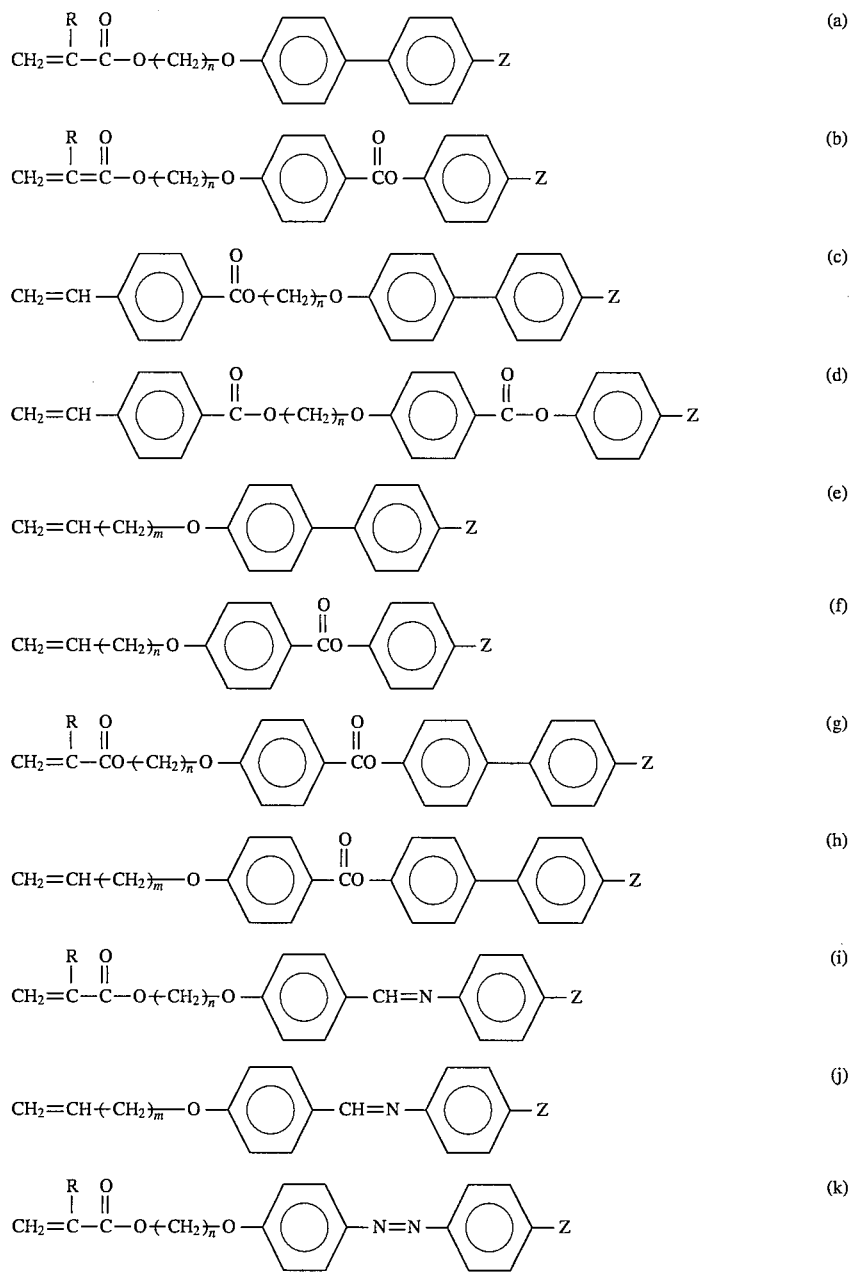

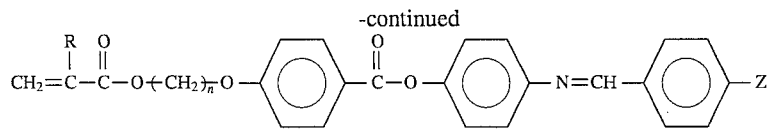

(l)

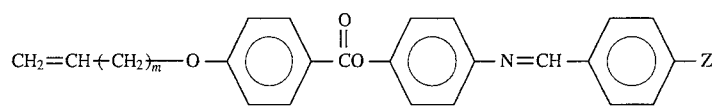

(m)

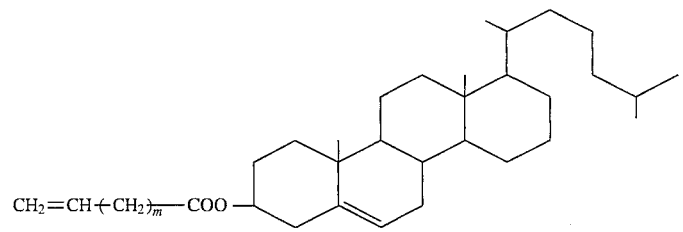

(n)

wherein R represents a methyl group or a hydrogen atom; Z represents a halogen atom, a cyano group, an alkoxy group, or a haloalkyl group; n represents an integer of from 2 to 30; and m represents an integer of from 1 to 20.

Non-liquid crystal monomers which can be used in the present invention are not particularly limited as long as they are polymerizable or addition-reactive while having no liquid crystal properties. Where a non-liquid crystal component is introduced into a polymer by polymerization, examples of the non-liquid crystal monomers include monofunctional monomers, e.g., (meth)acrylic acid, alkyl (meth)acrylates and derivatives thereof, styrene and derivatives thereof, (meth)acrylamide and derivatives thereof, (meth)acrylonitrile, ethylene and derivatives thereof, vinyl chloride, vinylidene chloride, butadiene, isoprene, chloroprene, and vinylpyrrolidone; and polyfunctional monomers having two or more polymerizable groups per molecule, e.g., (meth)acrylic esters of ethylene glycol, propylene glycol, 1,3-propanediol, glycerin or pentaerythritol, divinylbenzene, and divinyl adipate. The amount of polyfunctional monomers is generally from 1 to 100% by weight, preferably from 5 to 90% by weight, based on the total amount of monomers.

Where a non-liquid crystal component is introduced into a polymer by addition reaction to a reactive polymer, non-liquid crystal compounds having a reactive unsaturated bond at the terminal thereof, e.g., 1-propene, 1-butene, and 1-hexene, are used.

The polymeric substance used in the present invention can be prepared by copolymerizing a liquid crystal compound and a non-liquid crystal compound (polymerization process) or addition of a liquid crystal compound and a non-liquid crystal compound to a reactive prepolymer (addition reaction process). The polymerization process can be carried out by usual radical polymerization or ion polymerization of at least one polymerizable liquid crystal compound and at least one polymerizable non-liquid crystal compound. The addition reaction process can be carried out by adding a liquid crystal compound and a non-liquid crystal compound to a reactive prepolymer, e.g., hydrogen methylsiloxane polymers, in the presence of a platinum catalyst.

The molar ratio of the liquid crystal component to the non-liquid crystal component in the polymeric substance is preferably in the range of from $0.1/100$ to $100/1$. With the liquid crystal component proportion exceeding the above range, the polymeric substance tends to become compatible with the low-molecular weight liquid crystal molecules, resulting reductions in display characteristics. With that proportion being too small, on the other hand, the activity of the liquid crystal component would be lessened. A particularly preferred liquid crystal component to non-liquid crystal component molar ratio is from $0.1/100$ to $5/1$.

The molecular weight of the polymeric substance is generally from 1,000 to 1,000,000, and preferably from 10,000 to 500,000.

The low-molecular weight liquid crystals which can be used in the present invention include various compounds generally employed as display materials in liquid crystal displays. Examples thereof include biphenyl compound, phenyl benzoate compounds, cyclohexylbenzene compounds, azoxybenzene compounds, azobenzene compounds, azomethine compounds, terphenyl compounds, biphenyl benzoate compounds, cyclohexylbiphenyl compounds, phenylpyrimidine compounds, cyclohexylpyrimidine compounds, and cholesterol compounds. Among them, liquid crystal compounds showing positive dielectric anisotropy are preferred for particular application to electrically addressed displays. Some liquid crystals change their dielectric anisotropy from positive to negative with an increase of frequency of applied voltage over a certain value (cross-over frequency). It is possible to use such liquid crystals to provide a bifrequency driving system.

Preparation of the liquid crystal-polymer composite film of the present invention is explained below.

The most general process composed of preparing a mixed solution of the above-described polymeric substance and low-molecular weight liquid crystal in a common solvent, and coating the solution on a substrate, followed by drying.

Examples of the substrate include a transparent electroconductive substrate such as a plastic film (e.g., polyethylene terephthalate) or a glass plate that are coated with an electroconductive substance (e.g., tin oxide, indium oxide); an electroconductive substrate such as a plastic film on which an aluminum foil is adhered or aluminum is vapor-deposited; and a metal plate such as aluminum. Among these, the most preferred is a transparent electroconductive substrate composed of a glass plate coated with indium tin oxide (ITO) by vapor-deposition or sputtering.

Non-electroconductive substrate, such as a plastic film and a glass plate, may be used as a substrate on which the composite film of the present invention is produced. In such a case, an electrode may be separately provided to applying voltage.

The common solvent is not particularly limited unless it dissolves both the low-molecular weight liquid crystal compound and the polymeric substance and can be removed after coating. Examples thereof include alcohol solvents, such as methyl alcohol and ethyl alcohol; ketone solvents, such as acetone and methyl ethyl ketone; ether solvents, such as diethyl ether, tetrahydrofuran and dioxane; aromatic solvents, such as benzene and toluene; and other solvents, such as dimethylformamide and dimethyl sulfoxide. Mixed solvents composed of two or more of the above solvents are also preferably used.

Examples of the coating method include the blade coating method, the wire bar coating method, the dip coating method, the roll coating method, the spray coating method and the spin coating method. The drying method is not particularly limited unless the solvent can be removed from the coated film. Examples thereof include a blower dryer (or a hot air circulating dryer) and a vacuum dryer.

After coating and drying to form a composite film on a substrate, another substrate may be adhered on the composite film to produce various devices. The method for adhering the composite film and the substrate is not particularly limited and can be effected by simply superimposing and pressing unless no air bubble is introduced between the composite film and the substrate. The adhering of the composite film and the substrate may be conducted in atmospheric pressure but is preferably conducted in vacuo to prevent introduction air bubbles between the composite film and the substrate.

Alternatively, the composite film can also be obtained by sealing a composite film-forming solution containing the above-described monomers and low-molecular weight liquid crystal into a cell composed of a pair of counter electrode plate at the optimum gap therebetween and then polymerizing the monomers.

The cell is composed of a pair of counter substrates and spacers maintaining the gap disposed between the substrates. Thus, the substrate is preferably those having high rigidity such as a glass plate, and a glass plate coated with ITO is preferably used. As the spacers for maintaining the gap, commercially available spacers for liquid crystal cells, such as resin ball spacers and glass rod spacers, can be used.

The composite film-forming solution contains above-described monomers and low-molecular weight liquid crystal, as well as a polymerization initiator, such as heat polymerization initiators, e.g., azobisisobutyronitrile, and light polymerization initiators, e.g., benzophenone derivatives.

As the method for introducing the composite film-forming solution into the cell, methods generally employed for introducing liquid crystal into a liquid crystal cell can be used. For example, the cell is completely sealed except for one inlet, and the inlet is made in contact with the composite film-forming solution in vacuo, so that the solution is easily introduced into the cell due to capillary action. After introducing the solution into the cell, the inlet is sealed with a sealant, such as commercially available rapid-hardening type epoxy sealant and UV-curable sealant.

As the method for polymerizing the monomers contained in the composite film-forming solution having been introduced into the cell to produce the composite film of the present invention, a heat polymerization method by applying heat and a UV polymerization method by irradiating with ultraviolet ray are preferably used. The heat polymerization method can be effected by placing the cell containing the film-forming solution in an oven maintained at a polymerization temperature which is determined by the polymerization initiator used. The UV polymerization method can be effected by irradiating the cell with a ultraviolet ray having a wavelength which is determined by the polymerization initiator used.

While the content of the low-molecular weight liquid crystal in the composite film may vary according to the desired performance properties, a preferred weight ratio of the low-molecular weight liquid crystal to the polymeric substance is in the range of from $50/1$ to $1/10$. If the low-molecular weight liquid crystal content exceeds this range, it may be difficult to assure sufficient shape retention or mechanical strength of the resulting film. If it is lower than the range, desired performance as display material may be difficult to obtain. A particularly preferred weight ratio of the low-molecular weight liquid crystal to the polymeric substance is from $20/1$ to $1/5$.

In the liquid crystal-polymer composite film according to the present invention, the polymeric substance and the low-molecular weight liquid crystal compound are preferably in separate phases. The term "separate phases" used herein means that the composite film consists of a liquid phase composed of the low-molecular weight liquid crystal compound and a solid phase composed of the polymeric substance. The liquid phase may contain a small amount of the polymeric substance and the solid phase may contain a small amount of the low-molecular weight liquid crystal compound, unless the composite film contains both the liquid phase and the solid phase in a separated form.

Figure 1B:
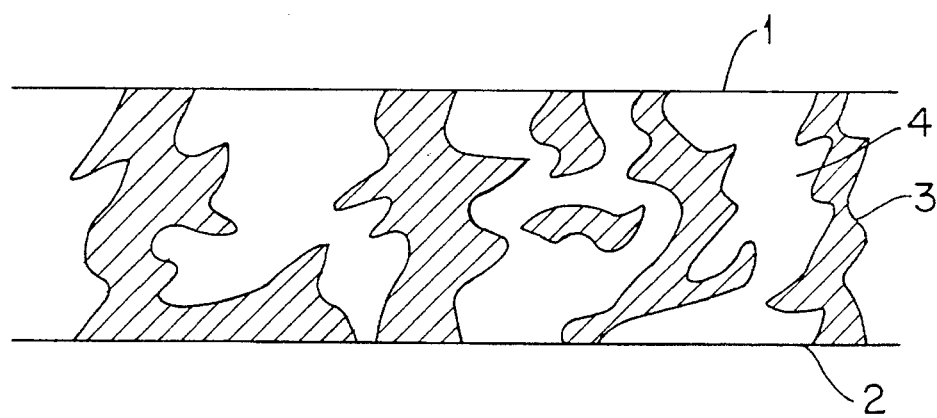
Figure 1C:
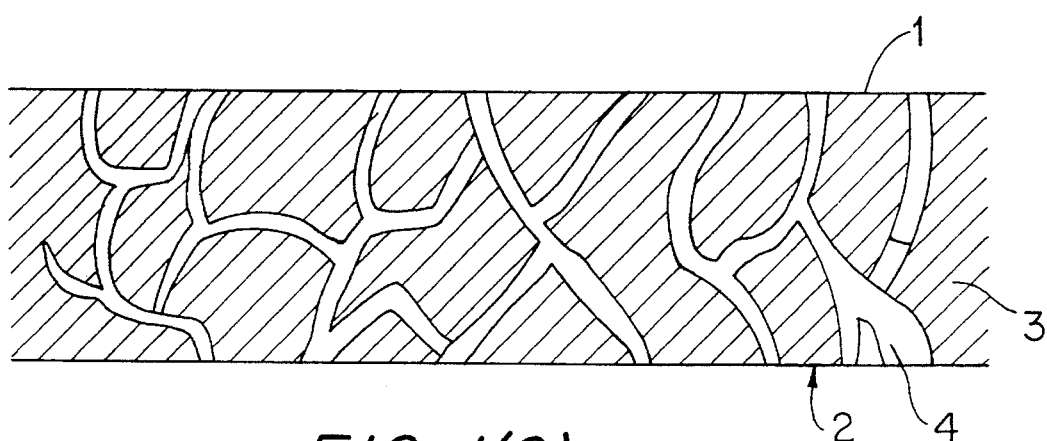

The composite film may have various microstructures depending on the kinds of the low-molecular weight liquid crystal and polymeric substance (i.e., their thermodynamic properties and chemical properties) or a mixing ratio of these materials. Examples of possible microstructures include a microdroplet structure as shown in FIG. 1-(A), a sponge structure as shown in FIG. 1-(B), and a polymer fiber structure as shown in FIG. 1-(C). In these figures, numeral 3 indicates a low-molecular weight liquid crystal component, and 4 indicates a polymer component. Transparent electrodes 1 and 2 for fabricating devices are also shown in these figures.

The thickness of the composite film according to the present invention is generally from 3 to 500 μm, preferably from 5 to 100 μm, and more preferably from 7 to 50 μm.

The liquid crystal-polymer composite film according to the present invention is applicable as such to display elements and memory elements. If desired, various compounds can be added for improving contrast, stability, and durability. For example, improvement in contrast can be achieved by addition of dichroic dyestuffs, such as anthraquinone dyes, styryl dyes, azomethine dyes, and azo dyes. It is preferable that the dichroic dye should be basically miscible (compatible) with the liquid crystal component while incompatible with the polymeric substance in the composite film. Further, antioxidants, ultraviolet absorbents, and various plasticizers may also be added for improving stability or durability. The amount of these additives is generally from 0.01 to 5% by weight based on the total weight of the composite film.

The composite film of the present invention can be applied to various devices, such as display elements, light controlling elements, optical modulation elements, optical shutters, and memory elements.

Devices using the composite film of the present invention preferably have a structure commonly employed in general liquid crystal elements in which the film is sandwiched between a pair of electrode plates as shown in FIG. 2. The particular state shown in FIG. 2 indicates that the low-molecular weight liquid crystal molecules are oriented with an electrical field applied to electrode plates 1 and 2. In FIG. 2, numeral 3 indicates a composite film, 4 indicates a polymer component, 5 indicates a low-molecular weight liquid crystal component, and 6 indicates a voltage application apparatus.

Examples of the electrode plates include transparent ones, such as ITO-coated glass plates or plastic films and NESA glass plates. As stated above, the devices can be prepared by forming a composite film on one of electrode plates and superposing the other electrode plate thereon, or sealing starting materials into a previously prepared liquid crystal cell and forming a composite film by polymerization reaction. In the production of devices, conventionally adopted modifications or alterations such as use of spacers and formation of a protective layer or an adhesive layer between an electrode plate and a composite film can be applied to the present invention. The following assumption is presented with reference to FIG. 3 to account for the working mechanism of the liquid crystal-polymer composite film according to the present invention. In FIG. 3-A, with no electric field applied, low-molecular weight liquid crystal component 3 is dispersed and supported in the composite film in a separated phase to cause irregular reflection of incident light, making the film white turbid. In this state, because the liquid crystal side chain in the polymeric substance has high affinity to the low-molecular weight liquid crystal molecules, the liquid crystal side chain and the low-molecular weight liquid crystal molecules are compatible with each other on the interface therebetween to form a domain of the latter as if it is surrounded by the interface of the former. If an appropriate electric field is applied to the film, the low-molecular weight liquid crystal molecules are aligned along the direction of electric field, and the composite film becomes transparent accordingly, permitting of transmission of incident light as shown in FIG. 3-(B). It is considered that in this state the liquid crystal side chains at the interface are also oriented in the same direction to lessen their anchoring effect at the interface so that switching between "on" and "off" states can be achieved at a low applied voltage.

Where a liquid crystal side chain which is oriented at a higher voltage than that required for orientation of the low-molecular weight liquid crystal is used, the orientation of the low-molecular weight liquid crystal is substantially governed by the interface of the liquid crystal side chains. As a result, the low-molecular weight liquid crystal manifests memory effects and hysteresis characteristics as observed with high-molecular weight liquid crystals. Thus, the composite film of the present invention accomplishes the objects of low voltage driving properties and memory properties which could not be achieved by the conventional liquid crystal-polymer composite films.

The present invention is now illustrated in greater detail with reference to Examples, but it should be understood that the present invention is not deemed to be limited thereto. All the parts, percents and ratios are by weight unless otherwise indicated.

EXAMPLE 1

0.5 g of a cyanobiphenyl acrylic monomer of formula (1) shown below as a liquid crystal monomer and 9.5 g of ethyl methacrylate as a non-liquid crystal monomer were copolymerized in tetrahydrofuran using azobisisobutyronitrile as an initiator. The reaction mixture was purified by reprecipitation using methanol to obtain 9.5 g of a polymeric substance. NMR analysis revealed that the composition of the resulting polymeric substance was substantially the same as the charged composition. The polymeric substance was found to have a weight average molecular weight of about 530,000 on a polystyrene conversion.

Liquid Crystal Monomer:

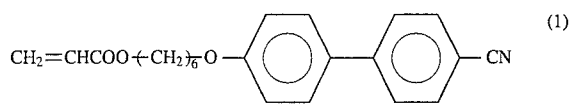

One part of the resulting polymer and 1 part of a low-molecular wight liquid crystal ("E-44" produced by BDH) were dissolved in toluene, and the solution was blade-coated on an ITO-coated glass substrate and dried to form a composite film having a thickness of about 10 μm. The film uniformly looked white turbid. Observation of the film under a polarizing microscope revealed fine domains of the low-molecular weight liquid crystal in separate phases.

An ITO-coated polyethylene terephthalate (PET) film was press-bonded on the composite film to prepare a sandwich cell for determination of voltage vs. transmission characteristics.

EXAMPLE 2

A polymeric substance was obtained in the same manner as in Example 1, except for changing the amounts of the cyanobiphenyl acrylic monomer and ethyl methacrylate to 0.1 g and 9.0 g, respectively. NMR analysis revealed that the composition of the resulting polymeric substance was substantially the same as the charged composition. The polymeric substance was found to have a weight average molecular weight of about 440,000 on a polystyrene conversion.

A composite film was prepared in the same manner as in Example 1 except for using the above-prepared polymeric substance. The resulting composite film evenly looked white turbid. Observation of the film under a polarizing microscope revealed fine domains of the low-molecular weight liquid crystal in separate phases.

A sandwich cell was obtained in the same manner as in Example 1.

COMPARATIVE EXAMPLE 1

Poly(ethyl methacrylate) was prepared in the same manner as in Example 1, except for using no liquid crystal monomer. The resulting polymer was found to have a weight average molecular weight of about 550,000 on a polystyrene conversion.

A composite film was prepared in the same manner as in Example 1, except for using the above-prepared polymer. The resulting composite film was similar to the films obtained in Examples 1 and 2 as far as the observations were made with eyes and under a polarizing microscope.

A sandwich cell was obtained in the same manner as in Example 1.

Figure 4:
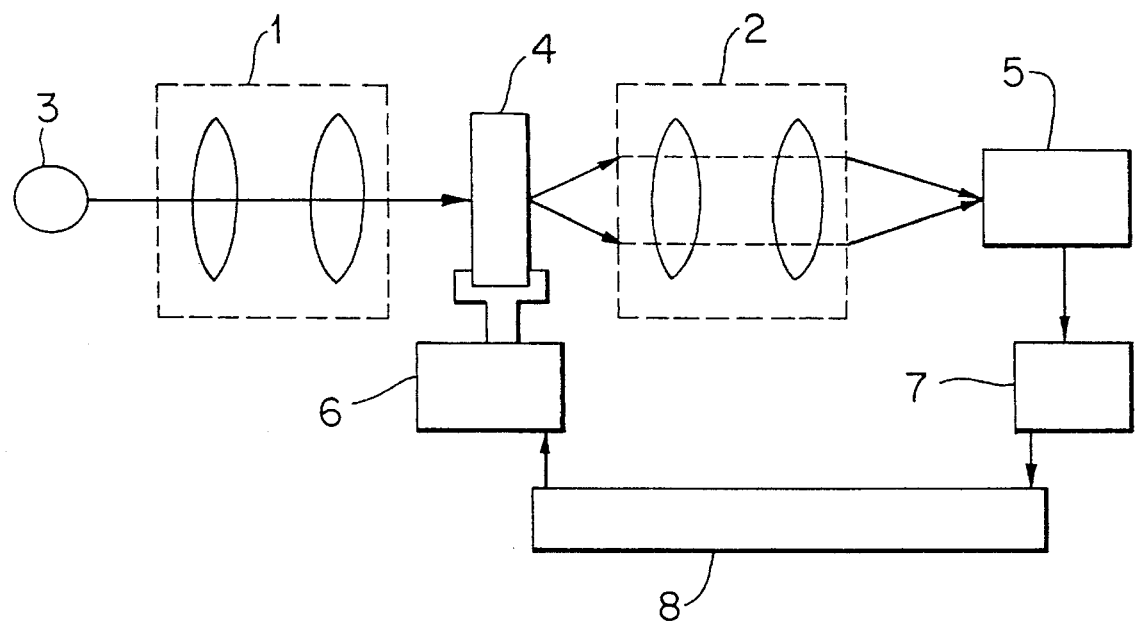
FIG. 4 is a schematic block diagram of an apparatus for evaluating the composite film according to the present invention.

Evaluation:

Voltage-transmission characteristics of the sandwich cells prepared in Examples 1 and 2 and Comparative Example 1 were examined as follows by means of an apparatus shown in FIG. 4.

1) Measurement of Transmitted Light Intensity:

White light emitted from 50W halogen lamp 3 was made into parallel rays through optical system 1 and then transmitted through cell sample 4. At the same time, an alternating voltage of square wave (100 Hz) was applied to the cell by means of voltage application apparatus 6. The light transmitted through the cell was introduced into optical system 2, in which only those rays whose maximum angle with respect to the incident light is within ±10° were collected. The transmitted light was converted to an electrical current in photodiode 5. The intensity of the transmitted light was read out with photoelectric spectrophotometer 7. The readout of the transmitted light intensity with spectrophotometer 7 and voltage application with voltage application apparatus 6 were automatically carried out by using computer 8. A percent transmission T (%) was calculated from the transmitted light intensity according to equation:

$$T = \frac{I_{sample} - I_{back}}{I_{blank} - I_{back}} \times 100$$

wherein $I_{sample}$ is a transmitted light intensity with a sample set; $I_{back}$ is a transmitted light intensity with the light of a light source being shut off; and $I_{black}$ is a transmitted light intensity with no sample set.

Figure 5:
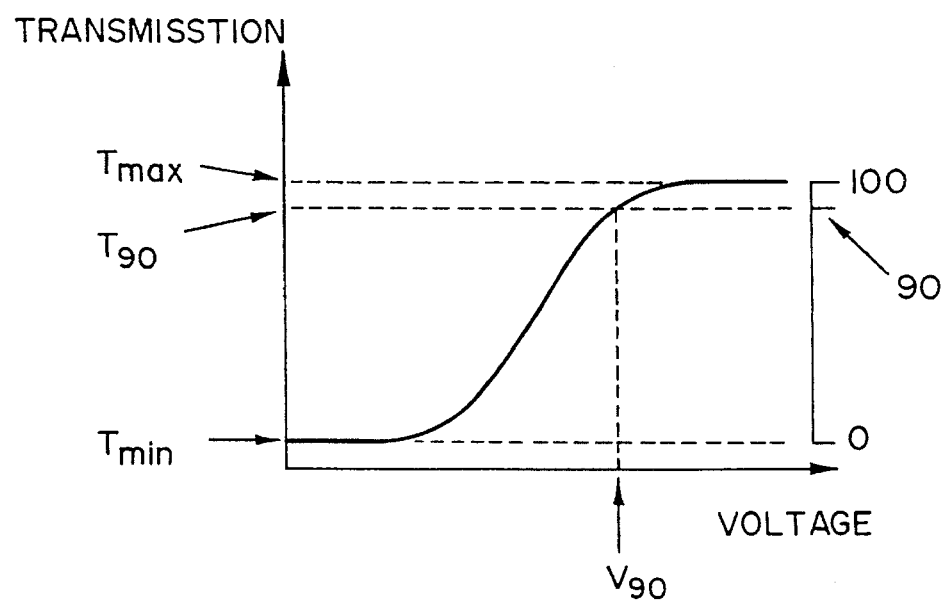
FIG. 5 is a graph of voltage vs. transmission.

The transmission measurement was made with every rise of applied voltage. The result was plotted as ordinate and the applied voltage as abscissa to prepare a voltage-transmission curve (V-T curve), and the voltage $V_{90}$ at which the transmission reaches 90% of the saturated transmission was obtained as a characteristic value as shown in FIG. 5. In FIG. 5, $T_{90}$ indicates 90% of the saturated transmission, $T_{max}$ indicates the saturated transmission, and $T_{min}$ indicates the minimum transmission.

Figure 6:
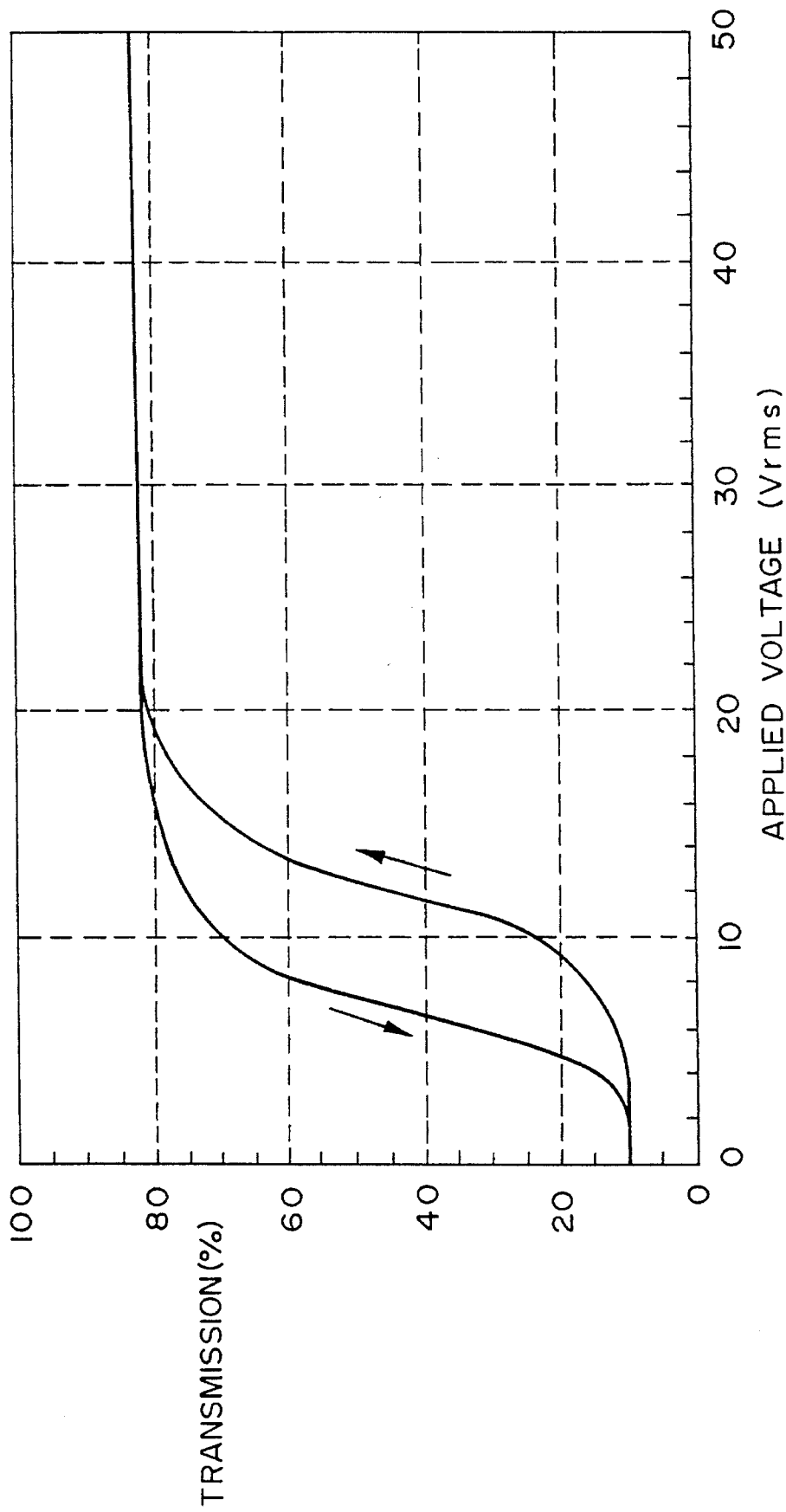
FIG. 6 is the graph of voltage vs. transmission of the composite film obtained in Example 1.

The V-T curve of the sample of Example 1 is shown in FIG. 6, and the characteristic value of each sample is shown in Table 1 below.

TABLE 1

| Example No. | Proportion of liquid crystal side chain (mol %) | $V_{90}$ (Vrms) | Memory properties |
| --- | --- | --- | --- |
| Example 1 | 1.7 | 17.5 | observed |
| Example 2 | 3.5 | 12.2 | observed |
| Comparative Example 1 | 0 | 60.7 | not observed |

It is seen from the results in Table 1 that the composite film according to the present invention can be driven at a lower voltage than required for the comparative film. It is also seen that the sample of Example 2 having a higher liquid crystal side chain content than in the sample of Example 1 exhibits greater effects of reducing driving voltage, thus clearly demonstrating the advantage of the present invention.

Further, FIG. 6 reveals a difference between the curve with a rise in voltage and that with a fall in voltage, that is, hysteresis characteristics (memory properties). Such hysteresis was repeatedly and reversibly observed. As discussed above, such a phenomenon appears to be a manifestation of memory properties ascribed to the liquid crystal side chain of the polymeric substance. Exploitation of the memory properties would make it feasible to achieve wide-area display which has been conventionally regarded difficult.

EXAMPLE 3

A polymeric substance was obtained in the same manner as in Example 1, except for using 0.5 g of a cyanobiphenyl methacrylic monomer having formula (2) shown below as a liquid crystal monomer and 9.5 g of methyl methacrylate (hereinafter abbreviated as MMA) as a non-liquid crystal monomer. The resulting polymeric substance had substantially the same composition as the charged composition and a weight average molecular weight of 430,000 on a polystyrene conversion.

Liquid Crystal Monomer:

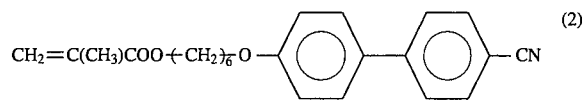

A liquid crystal sandwich cell for evaluation was prepared in the same manner as in Example 1.

EXAMPLE 4

A polymeric substance was obtained in the same manner as in Example 1, except for using 1.0 g of the cyanobiphenyl acrylic monomer of formula (2) as a liquid crystal monomer and 9.0 g of MMA as a non-liquid crystal monomer. The resulting polymeric substance had substantially the same composition as the charged composition and a weight average molecular weight of about 540,000 on a polystyrene conversion.

A liquid crystal sandwich cell for evaluation was prepared in the same manner as in Example 1.

COMPARATIVE EXAMPLE 2

Poly(methyl methacrylate) was prepared in the same manner as in Comparative Example 1, except for using methyl methacrylate alone. The resulting poly(methyl methacrylate) had a weight average molecular weight of about 400,000 on a polystyrene conversion.

A liquid crystal sandwich cell for evaluation was prepared in the same manner as in Example 1.

Each of the cells obtained in Examples 3 and 4 and Comparative Example 2 was evaluated in the same manner as in Example 1, and the results obtained are shown in Table 2 below.

TABLE 2

| Example No. | Proportion of liquid crystal side chain (mol %) | $V_{90}$ (Vrms) | Memory properties |
| --- | --- | --- | --- |
| Example 3 | 1.5 | 80 | observed |
| Example 4 | 3.1 | 65 | observed |
| Comparative Example 2 | 0 | 110 | not observed |

Similarly to Examples 1 and 2, the composite film of the present invention revealed the effects on reducing driving voltage and the manifestation of memory properties, probably owing to the introduced liquid crystal side chains of the polymeric substance.

EXAMPLE 5

The following compounds were mixed to prepare a polymerizing composition:

| (1) Polymerizable Compounds: | |
| --- | --- |
| n-Butyl acrylate (product of Wako Pure Chemical Industries, Ltd.) | 3 parts |
| Cyanobiphenyl acrylic monomer of formula (1) | 0.5 part |

-continued

| (2) Polymerization Initiator: | |
|---|---|
| 2,2'-Azobisisobutyronitrile (product of Wako Pure Chemical Industries, Ltd.) | 0.4 part |

2.5 parts of the polymerization composition was mixed with 7.5 parts of a commercially available liquid crystal ("E-44") to form a uniform solution which was colorless transparent at room temperature. The resulting solution was injected under reduced pressure into an ITO-coated glass cell having a cell gap of 10 µm and, after sealing, heat-treated at 60° C. for 15 hours to cause the polymerizing composition to thermally polymerize. There was formed a liquid crystal-polymer composite film which was highly white turbid at room temperature.

EXAMPLE 6

The following compounds were mixed to prepare a polymerizing composition:

| (1) Polymerizable Compounds: | |
|---|---|
| n-Butyl acrylate (product of Wako Pure Chemical Industries, Ltd.) | 3 parts |
| Ethylene glycol dimethacrylate Industries, Ltd.) | 1 part |
| Cyanobiphenyl acrylic monomer of formula (1) | 0.5 part |

| (2) Polymerization Initiator: | |
|---|---|
| 2-hydroxy-2-methyl-1-phenylpropan-1-one (product of Merck Co.) | 0.5 part |

2.5 parts of the polymerization composition was mixed with 7.5 parts of a commercially available liquid crystal ("E-44") to form a uniform solution which was colorless transparent at room temperature. The resulting solution was injected under reduced pressure into an ITO-coated glass cell having a cell gap of 10 µm and, after sealing, light of a 500W-xenon lamp was irradiated on the cell to cause the polymerizing composition to photopolymerize. There was formed a liquid crystal-polymer composite film which was highly white turbid at room temperature.

COMPARATIVE EXAMPLES 3 AND 4

A liquid crystal-polymer composite film was prepared in the same manner as in Example 5 or 6, except for using no cyanobiphenyl monomer in the polymerizing composition.

Each samples obtained in Examples 5 and 6 and Comparative Examples 3 and 4 was evaluated to determine $V_{90}$ in the same manner as in Example 1. In addition, a contrast ratio (CR) was calculated from the maximum transmission ($T_{max}$) and the minimum transmissions ($T_{min}$) of the V-T curve according to equation:

$$CR = T_{max}/T_{min}$$

The results obtained are shown in Table 3 below.

TABLE 3

| Example No. | $V_{90}$ (Vrms) | CR |
|---|---|---|
| Example 5 | 18.5 | 42 |
| Example 6 | 15.7 | 38 |
| Comparative Example 3 | 43.7 | 51 |
| Comparative Example 4 | 49.1 | 39 |

The composite film according to the present invention proved to be driven at a lower voltage than required for the comparative samples and also to have a sufficient contrast.

As described above the liquid crystal-polymer composite film of the present invention is characterized by requiring no polarizing sheet, making it feasible to obtain bright displays, requiring a low driving voltage, and exhibiting memory properties. Therefore, it is applicable to not only light-controlling elements but display elements, optical modulation elements, optical shutters, and memory elements. In particular, it is applicable to wide-area display elements (transmission and reflection mode) which have not been achieved without difficulty.

While the invention has been described in detail and with reference to specific examples thereof, it will be apparent to one skilled in the art that various changes and modifications can be made therein without departing from the spirit and scope thereof.

What is claimed is:

1. A liquid crystal-polymer composite film consisting essentially of a polymeric substance carrying a liquid crystal component and a non-liquid crystal component in the side chain thereof and having dispersed therein a low-molecular weight liquid crystal compound, wherein said polymeric substance is a copolymer of a liquid crystal vinyl monomer and a non-liquid crystal vinyl monomer and said polymeric substance and said low-molecular weight liquid crystal compound are in separate phases.

2. A liquid crystal-polymer composite film as claimed in claim 1, wherein the molar ratio of said liquid crystal component to said non-liquid crystal component is in the range of from $0.1/100$ to $100/1$.

3. A liquid crystal-polymer composite film as claimed in claim 2, wherein the molar ratio of said liquid crystal component to said non-liquid crystal component is in the range of from $0.1/100$ to $5/1$.

4. A liquid crystal-polymer composite film as claimed in claim 1, wherein the weight ratio of said low-molecular weight liquid crystal compound to said polymeric substance is in the range of from $50/1$ to $1/10$.

5. A liquid crystal-polymer composite film as claimed in claim 4, wherein the weight ratio of said low-molecular weight liquid crystal compound to said polymeric substance is in the range of from $20/1$ to $1/5$.

6. An optical modulation element comprising a liquid crystal-polymer composite film consisting essentially of a polymeric substance carrying a liquid crystal component and a non-liquid crystal component in the side chain thereof and having dispersed therein a low-molecular weight liquid crystal compound, wherein said polymeric substance is a copolymer of a liquid crystal vinyl monomer and a non-liquid crystal vinyl monomer and said polymeric substance and said low-molecular weight liquid crystal compound are in separate phases, and means for voltage application provided close to said liquid crystal-polymer composite film.

7. An optical modulation element as claimed in claim 6, wherein the molar ratio of said liquid crystal component to said non-liquid crystal component is in the range of from $0.1/100$ to $100/1$.

8. An optical modulation element as claimed in claim 7, wherein the molar ratio of said liquid crystal component to said non-liquid crystal component is in the range of from $0.1/100$ to $5/1$.

9. An optical modulation element as claimed in claim 6, wherein the weight ratio of said low-molecular weight liquid crystal compound to said polymeric substance is in the range of from $50/1$ to $1/10$.

10. An optical modulation element as claimed in claim 9, wherein the weight ratio of said low-molecular weight liquid crystal compound to said polymeric substance is in the range of from $20/1$ to $1/5$.

* * * * *